(12) United States Patent
Hill et al.

(10) Patent No.: US 8,256,004 B1
(45) Date of Patent: Aug. 28, 2012

(54) CONTROL TRANSPARENCY FRAMEWORK

(75) Inventors: Marshell L. Hill, Flower Mound, TX (US); Tianay Carroll, Coppell, TX (US); Johnna Carter, Richardson, TX (US); Chris Higgins, Charlotte, NC (US); Chad Renfro, Dalls, TX (US); Dan Yomine, Trophy Club, TX (US)

(73) Assignee: Bank of America Corporation, Charlotte, NC (US)

( * ) Notice: Subject to any disclaimer, the term of this patent is extended or adjusted under 35 U.S.C. 154(b) by 936 days.

(21) Appl. No.: 12/260,422

(22) Filed: Oct. 29, 2008

(51) Int. Cl.
G06F 11/00 (2006.01)
H04L 9/32 (2006.01)

(52) U.S. Cl. ............... 726/25; 726/26; 726/27; 726/28; 726/29; 726/30; 713/187; 713/188; 713/189; 713/190

(58) Field of Classification Search ............... 726/25
See application file for complete search history.

(56) References Cited

U.S. PATENT DOCUMENTS

| | | |
|---|---|---|
| 2002/0018269 A1 | 2/2002 | Chaudhuri et al. |
| 2002/0030864 A1 | 3/2002 | Chaudhuri et al. |
| 2002/0109879 A1 | 8/2002 | Wing So |
| 2003/0018513 A1 | 1/2003 | Hoffman et al. |
| 2003/0028412 A1 | 2/2003 | Hoffman et al. |
| 2003/0040986 A1 | 2/2003 | Hoffman et al. |
| 2003/0041001 A1 | 2/2003 | Hoffman et al. |
| 2003/0046089 A1 | 3/2003 | Menninger et al. |
| 2003/0046120 A1 | 3/2003 | Hoffman et al. |
| 2003/0046121 A1 | 3/2003 | Menninger et al. |
| 2003/0046136 A1 | 3/2003 | Hoffman et al. |
| 2003/0046190 A1 | 3/2003 | Hoffman et al. |
| 2003/0046214 A1 | 3/2003 | Menninger |
| 2003/0048301 A1 | 3/2003 | Menninger |
| 2003/0050807 A1 | 3/2003 | Hoffman et al. |
| 2003/0050808 A1 | 3/2003 | Mor |
| 2003/0050809 A1 | 3/2003 | Hoffman et al. |
| 2003/0050822 A1 | 3/2003 | Hoffman et al. |
| 2003/0050823 A1 | 3/2003 | Gehman et al. |
| 2003/0050828 A1 | 3/2003 | Hoffman et al. |
| 2003/0050845 A1 | 3/2003 | Hoffman et al. |
| 2003/0050859 A1 | 3/2003 | Rodriguez et al. |
| 2003/0050867 A1 | 3/2003 | Menninger et al. |
| 2003/0050868 A1 | 3/2003 | Hoffman et al. |
| 2003/0055692 A1 | 3/2003 | Menninger |

(Continued)

OTHER PUBLICATIONS

International Search Report and the Written Opinion of the International Searching Authority mailed Apr. 25, 2011 for International Application PCT/US11/26111.

*Primary Examiner* — Longbit Chai
(74) *Attorney, Agent, or Firm* — Moore & Van Allen, PLLC; Ryan P. Harris

(57) ABSTRACT

Embodiments of the present invention are directed to methods, systems and computer program products for a control transparency framework which is, in one embodiment, a transparent (i.e. easy to understand) and actionable risk/reward approach for organizational processes, controls, training and development. The control transparency framework method includes identifying threats to an organization, developing a risk score for each of the threats to develop a threat portfolio, developing a maturity portfolio, developing a control portfolio, determining a gap portfolio, and developing a control transparency portfolio to close gaps. A gap exists between a target state maturity level of each identified threat and a current maturity level of each control assigned to handle each identified threat, such that the gap occurs if the target state maturity level is at a level that is lower than the control maturity level.

27 Claims, 16 Drawing Sheets

U.S. PATENT DOCUMENTS

| | | |
|---|---|---|
| 2003/0055693 A1 | 3/2003 | Hoffman et al. |
| 2003/0055694 A1 | 3/2003 | Menninger |
| 2003/0055700 A1 | 3/2003 | Hoffman et al. |
| 2003/0055704 A1 | 3/2003 | Reece |
| 2003/0055708 A1 | 3/2003 | Hoffman et al. |
| 2003/0055709 A1 | 3/2003 | Hoffman et al. |
| 2003/0055710 A1 | 3/2003 | Burk et al. |
| 2003/0055731 A1 | 3/2003 | Fouraker et al. |
| 2003/0055734 A1 | 3/2003 | Hoffman et al. |
| 2003/0055750 A1 | 3/2003 | Menninger |
| 2003/0061084 A1 | 3/2003 | Menninger |
| 2003/0061102 A1 | 3/2003 | Menninger et al. |
| 2003/0061124 A1 | 3/2003 | Menninger et al. |
| 2003/0061125 A1 | 3/2003 | Hoffman et al. |
| 2003/0061130 A1 | 3/2003 | Hoffman et al. |
| 2003/0061174 A1 | 3/2003 | Menninger |
| 2003/0065541 A1 | 4/2003 | Menninger |
| 2003/0065549 A1 | 4/2003 | Hoffman et al. |
| 2003/0065550 A1 | 4/2003 | Hoffman et al. |
| 2003/0065551 A1 | 4/2003 | Hoffman et al. |
| 2003/0065557 A1 | 4/2003 | Hoffman et al. |
| 2003/0065627 A1 | 4/2003 | Menninger |
| 2003/0066886 A1 | 4/2003 | Hoffman et al. |
| 2003/0069765 A1 | 4/2003 | Menninger |
| 2003/0069766 A1 | 4/2003 | Hoffman et al. |
| 2003/0069767 A1 | 4/2003 | Menninger |
| 2003/0069768 A1 | 4/2003 | Hoffman et al. |
| 2003/0069769 A1 | 4/2003 | Hoffman et al. |
| 2003/0069770 A1 | 4/2003 | Burk et al. |
| 2003/0069771 A1 | 4/2003 | Menninger et al. |
| 2003/0069774 A1 | 4/2003 | Hoffman et al. |
| 2003/0069778 A1 | 4/2003 | Menninger et al. |
| 2003/0069779 A1 | 4/2003 | Menninger et al. |
| 2003/0069786 A1 | 4/2003 | Hoffman et al. |
| 2003/0069791 A1 | 4/2003 | Menninger |
| 2003/0069794 A1 | 4/2003 | Hoffman et al. |
| 2003/0069798 A1 | 4/2003 | Hoffman |
| 2003/0069799 A1 | 4/2003 | Hoffman et al. |
| 2003/0069813 A1 | 4/2003 | Burk |
| 2003/0069814 A1 | 4/2003 | Hoffman et al. |
| 2003/0069818 A1 | 4/2003 | Menninger |
| 2003/0069823 A1 | 4/2003 | Hoffman et al. |
| 2003/0069824 A1 | 4/2003 | Menninger |
| 2003/0069825 A1 | 4/2003 | Hoffman et al. |
| 2003/0069859 A1 | 4/2003 | Hoffman et al. |
| 2003/0074205 A1 | 4/2003 | Menninger |
| 2003/0074206 A1 | 4/2003 | Hoffman et al. |
| 2003/0074237 A1 | 4/2003 | Sechrist et al. |
| 2003/0074238 A1 | 4/2003 | Hoffman et al. |
| 2003/0074239 A1 | 4/2003 | Hoffman et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menninger et al. |
| 2003/0078787 A1 | 4/2003 | Hoffman et al. |
| 2003/0078818 A1 | 4/2003 | Hoffman et al. |
| 2003/0078819 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0083909 A1 | 5/2003 | Hoffman et al. |
| 2003/0083918 A1 | 5/2003 | Hoffman et al. |
| 2003/0083947 A1 | 5/2003 | Hoffman et al. |
| 2003/0088449 A1 | 5/2003 | Menninger |
| 2003/0088474 A1 | 5/2003 | Hoffman et al. |
| 2003/0097317 A1 | 5/2003 | Burk et al. |
| 2004/0093298 A1 | 5/2004 | McClure, III et al. |
| 2004/0193482 A1 | 9/2004 | Hoffman et al. |
| 2004/0236621 A1 | 11/2004 | Eder |
| 2005/0060245 A1 | 3/2005 | Hoffman et al. |
| 2005/0086530 A1* | 4/2005 | Goddard ............. 713/201 |
| 2006/0015416 A1 | 1/2006 | Hoffman et al. |
| 2006/0053043 A1 | 3/2006 | Clarke |
| 2006/0059253 A1 | 3/2006 | Goodman et al. |
| 2006/0064481 A1 | 3/2006 | Baron et al. |
| 2006/0064485 A1 | 3/2006 | Baron et al. |
| 2006/0064486 A1 | 3/2006 | Baron et al. |
| 2006/0095915 A1 | 5/2006 | Clater |
| 2006/0161444 A1 | 7/2006 | Lubrecht et al. |
| 2006/0161879 A1 | 7/2006 | Lubrecht et al. |
| 2006/0206246 A1 | 9/2006 | Walker |
| 2007/0226099 A1 | 9/2007 | Senturk-Doganasksoy et al. |
| 2007/0288208 A1 | 12/2007 | Grigsby et al. |
| 2008/0047016 A1 | 2/2008 | Spoonamore |
| 2008/0086342 A1 | 4/2008 | Curry et al. |
| 2008/0208667 A1 | 8/2008 | Lymbery et al. |
| 2008/0221944 A1 | 9/2008 | Kelly et al. |
| 2008/0222734 A1 | 9/2008 | Redlich et al. |
| 2008/0243524 A1 | 10/2008 | Agrawal et al. |
| 2008/0270448 A1 | 10/2008 | Brennan et al. |
| 2009/0254572 A1 | 10/2009 | Redlich et al. |
| 2009/0265787 A9 | 10/2009 | Baudoin et al. |
| 2010/0010968 A1 | 1/2010 | Redlich et al. |

* cited by examiner

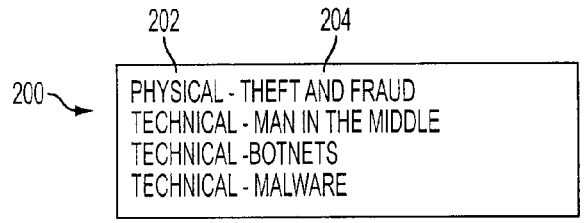

FIG. 2A

| | A | D | E | F |
|---|---|---|---|---|
| | THREAT | IMPACT | PROBABILITY | RISK |
| 1 | | | | |
| 2 | PHYSICAL - THEFT AND FRAUD | 5 | 5 | 25 |
| 3 | TECHNICAL - MAN IN THE MIDDLE | 3 | 5 | 15 |
| 4 | TECHNICAL - BOTNETS | 3 | 5 | 15 |
| 5 | TECHNICAL - MALWARE | 3 | 5 | 15 |
| 6 | TECHNICAL - COMPUTING INFRASTRUCTURE MALFUNCTION | 3 | 5 | 15 |
| 7 | TECHNICAL - NETWORK INFRASTRUCTURE FAILURE | 5 | 3 | 15 |
| 8 | PEOPLE - ESPIONAGE AND INSIDER THREAT | 3 | 3 | 9 |
| 9 | TECHNICAL - DENIAL OF SERVICE | 5 | 1 | 5 |
| 10 | PEOPLE - TECHNICAL SUBTERFUGE (--ISHING) | 1 | 5 | 5 |
| 11 | PEOPLE - LOST LAPTOP/CPU/MOBILE DEVICE | 1 | 5 | 5 |
| 12 | TECHNICAL - SPAM | 1 | 5 | 5 |
| 13 | PEOPLE - SOCIAL ENGINEERING | 1 | 3 | 3 |
| 14 | TECHNICAL - UNAUTHORIZED ACCESS (XSS, SQL INJECTION) | 3 | 3 | 9 |
| 15 | TECHNICAL - ZERO-DAY THREAT | 3 | 1 | 3 |
| 16 | TECHNICAL - SNIFFING | 3 | 1 | 3 |
| 17 | TECHNICAL - INFORMATION WARFARE AND DENIAL OF SPACE | 1 | 1 | 1 |
| 18 | PEOPLE - SHOULDER SURFING | 1 | 1 | 1 |
| 19 | PROCESS - PROCESS FAILURE | 1 | 1 | 1 |
| 20 | TECHNICAL - ELECTROMAGNETIC PULSE | 1 | 1 | 1 |
| 21 | TECHNICAL - COMMUNICATIONS FAILURE | 1 | 1 | 1 |
| 22 | PHYSICAL - BOMBING | 0 | 0 | 0 |
| 23 | PHYSICAL - DUMPSTER DIVING | 0 | 0 | 0 |
| 24 | PHYSICAL - SABOTAGE AND VANDALISM | 0 | 0 | 0 |

FIG. 2B

| PROCESS/ CONTROL | COVERAGE TYPE | METRICS | | |
|---|---|---|---|---|
| | | COVERAGE | RISK | BEHAVIOR |
| NPI (UNENCRYPTED) | DETECTIVE | 90% | # OF NPI VIOLATIONS | # OF REPEAT OFFENDERS |
| ANTI-VIRUS | DETECT & PREVENT | 95% | # OF QUARANTINED INFECTIONS | # OF USERS WITH HIGH INFECTION RATE |
| PROXY BLOCK | PREVENTATIVE | 95% | # OF SITES BLOCKED WITH DATA LOSS VECTOR | NO |
| NPI (ENCRYPTED) | | NO | NO | NO |

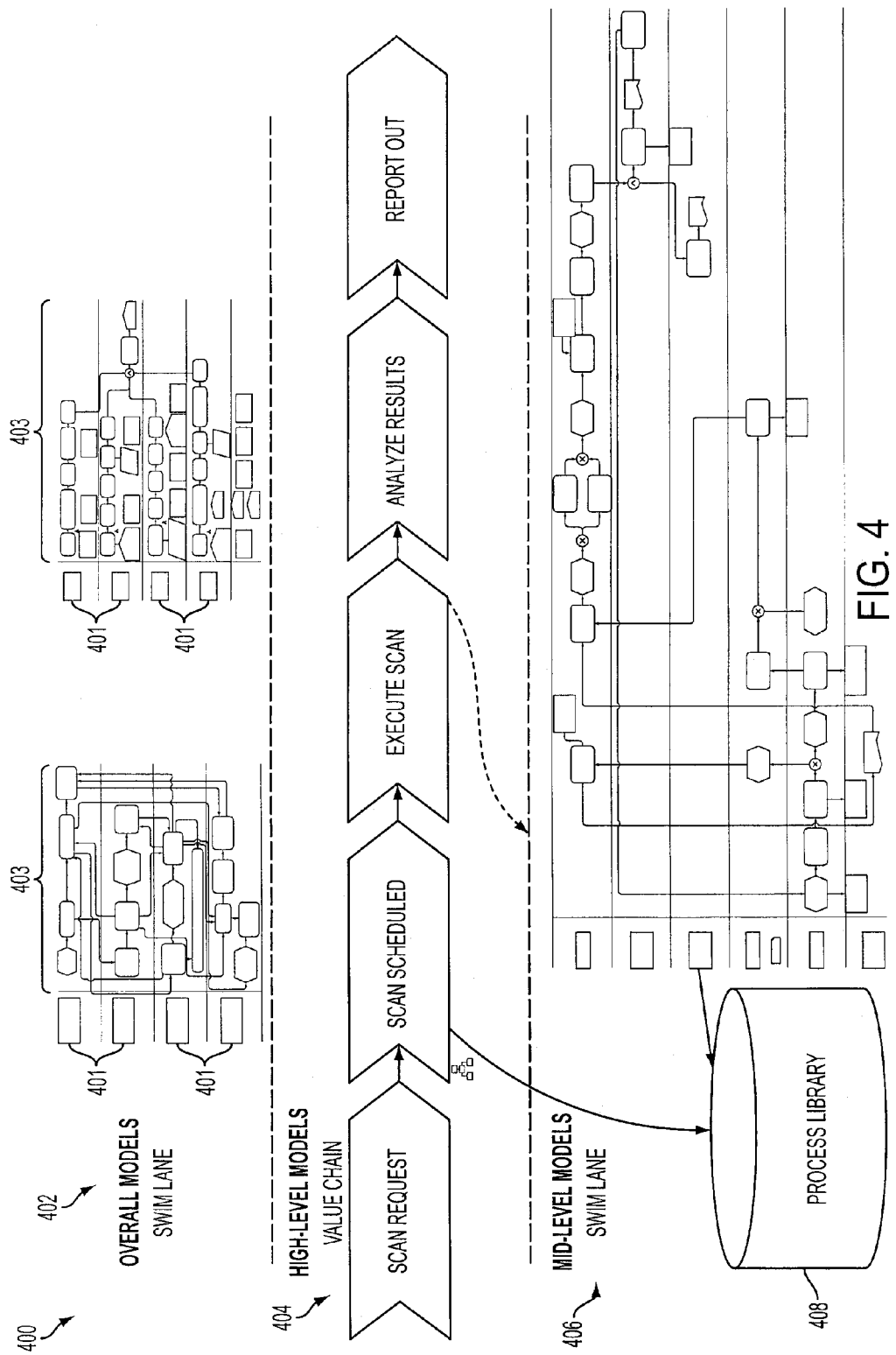

FIG. 5A — 500

| | | PRODUCTS & SERVICES | VULNERABILITY MANAGEMENT PROCESSES | MATURITY LEVEL - CURRENT - |
|---|---|---|---|---|
| PRO-GRAM | FUNC-TION | - CONTROLS - | | NON-EXISTENT INITAL REPEATABLE DEFINED MANAGED OPTIMIZED |
| REMEDIATION & REPORTING | | | | |
| | REMEDIATION | | | |
| | | COMPLIANCE REMEDIATION | | REPEATABLE |
| | | | ESM - SERVER COMPLIANCE REMEDIATION | REPEATABLE |
| | | | ESM - DATABASE COMPLIANCE REMEDIATION | REPEATABLE |
| | | | FIREWALL RULESET REMEDIATION | NON-EXISTENT/NEW |
| | | | RED RULE APPROVAL PROCESS | REPEATABLE |
| | | | ROGUE WIRELESS DEVICE REMEDIATION | REPEATABLE |
| | | | LAPTOP/DESKTOP COMPLIANCE REMEDIATION | NON-EXISTENT/NEW |
| | | | NETWORK/INFRASTRUCTURE COMPLIANCE REMEDIATION | REPEATABLE |

| PRO-GRAM | FUNC-TION | - CONTROLS - | INSIDER THREAT | UNINTE-NTIONAL ERROR | SOCIAL ENGIN-EERING | MAL-WARE | BOTNET /DDoS | FRAUD | -ISHING | UNAUTH-ORIZED ACCESS | ZERO-DAY | MAN-IN-THE-MIDDLE |
|---|---|---|---|---|---|---|---|---|---|---|---|---|
| REMEDIATION & REPORTING | | | | | | | | | | | | |
| | REMEDIATION | | | | | | | | | | | |
| | | COMPLIANCE REMEDIATION | 81 | | | | | 9 | | 3 | | |

FIG. 5B

| SUPPLIER ASSESSMENT (TIER 1&2 SUPPLIERS ONLY) | INSIDER THREAT | UNINTENTIONAL ERROR | SOCIAL ENGINEERING | MALWARE | BOTNETS /DDoS | FRAUD | -ISHING | UNAUTHORIZED ACCESS | ZERO-DAY | MAN-IN-THE-MIDDLE | TOTAL |
|---|---|---|---|---|---|---|---|---|---|---|---|
| | 81 | 81 | | 27 | 9 | 9 | | 3 | | | 210 |

| THREAT | | PROCESS/ CONTROL | METRICS | | | | CURRENT LEVEL | TARGET LEVEL |
|---|---|---|---|---|---|---|---|---|
| | | | COVERAGE TYPE | COVERAGE | RISK | BEHAVIOR | | |
| INSIDER THREAT | TARGET SPAN OF CONTROL (ALL KNOWN THREAT VECTORS) | NPI (UNENCRYPTED) | DETECTIVE | 90% | # OF NPI VIOLATIONS | # OF REPEAT OFFENDERS | DEFINED | DEFINED |
| | CURRENT SPAN OF CONTROL | ANTI-VIRUS | DETECT & PREVENT | 95% | # OF QUARANTINED INFECTIONS | # OF USERS WITH HIGH INFECTION RATE | DEFINED | DEFINED |
| | | PROXY BLOCK | PREVENTATIVE | 95% | # OF SITES BLOCKED WITH DATA LOSS VECTOR. | | INITIAL | REPEATABLE |
| | GAP | NPI (ENCRYPTED) | NO | NO | NO | NO | NON-EXISTENT | INITIAL |

| | PROCESS/ CONTROL | COVERAGE TYPE | METRICS | | | | CURRENT LEVEL | GAP | TARGET LEVEL |
|---|---|---|---|---|---|---|---|---|---|
| | | | COVERAGE | RISK | | BEHAVIOR | | | |
| CURRENT SPAN OF CONTROL | NPI (UNENCRYPTED) | DETECTIVE | 90% | # OF NPI VIOLATIONS | | # OF REPEAT OFFENDERS | DEFINED | | DEFINED |
| | ANTI-VIRUS | DETECT & PREVENT | 95% | # OF QUARANTINED INFECTIONS | | # OF USERS WITH HIGH INFECTION RATE | DEFINED | NO GAP | DEFINED |
| | PROXY BLOCK | PREVENTATIVE | 95% | # OF SITES BLOCKED WITH DATA LOSS VECTOR. | | | DEFINED | NO GAP | DEFINED |
| GAP | NPI (ENCRYPTED) | | NO | NO | | NO | INITIAL | TECHNOLOGY DOES NOT HAVE GRANULAR REPORTING | REPEATABLE |
| TARGET SPAN OF CONTROL (ALL KNOWN THREAT VECTORS) | | | | | | | NON-EXISTENT | NEED INITIAL DETECTION ON ENCRYPTED CHANNELS | INITIAL |

FIG. 10A

| PRODUCT & SERVICE | IDENTIFIED PLANS / PROCESSES / PROCEDURES | CURRENT MATURITY | CURRENT MATURITY GAPS & DELIVERABLES | PRIORITY | RISK | TARGET DATE | STATUS | NEXT MATURITY STEPS | TARGET MATURITY (BASED ON GIPBC CONTROLS INVENTORY - REVISED) | NOTES | PROCESS OWNERSHIP |
|---|---|---|---|---|---|---|---|---|---|---|---|
| | CPE RESPONSIBILITY: | MATURITY LEVEL AS OF THE MOST RECENT ASSESSMENT | SEE PROCESS TRACKING - GAPS THAT EXIST FOR THE CURRENT MATURITY LEVEL & DELIVERABLE(S) REQUIRED TO CLOSE GAP | | | DATE TO BE COMPLETED | BI-WEEKLY STATUS | COMPLETED STARTED NA | TARGET MATURITY LEVEL 'APPROPRIATE' TO THE PROCESS | GENERAL NOTES -ALL NEXT LEVEL ATTRIBUTES / BEST PRACTICES -ALL PROCESS MATURITY STEPS | WHO IS RESPONSIBLE FOR PROCESS - USE AND MANAGEMENT |
| P&S NAME | PROCESS NAME | | i.e. PROCEDURE PROCESS FLOW | | | 4/24/2008 | | | | | TEAM MEMBER |

| THREAT | | PROCESS CONTROL | COVERAGE TYPE | METRICS | | | | CURRENT LEVEL | GAP | TARGET LEVEL | RISK | RISK DECISION | RISK SIGN-OFF/APPROVAL | FUNDED? |
|---|---|---|---|---|---|---|---|---|---|---|---|---|---|---|
| | | | | COVERAGE | RISK | BEHAVIOR | | | | | | | | |
| INSIDER THREAT | TARGET SPAN OF CONTROL: ALL KNOWN THREAT VECTORS | AP (UNENCRYPTED) | DETECTIVE | 90% | # OF NPI VIOLATIONS | # OF REPEAT OFFENDERS | | DEFINED | NO GAP | DEFINED | DEFECTS WILL NOT BE AUTOMATICALLY DETECTED | ACCEPT | USER 1 | N/A |
| | CURRENT SPAN OF CONTROL | ANTI-VIRUS | DETECT & PREVENT | 95% | # OF QUARANTINED INFECTIONS | # OF USERS WITH HIGH INFECTION RATE | | DEFINED | NO GAP | DEFINED | DEFECTS WILL NOT BE AUTOMATICALLY DETECTED | ACCEPT | USER 2 | N/A |
| | | PROXY BLOCK | PREVENTATIVE | 95% | # OF SITES BLOCKED WITH DATA LOSS VECTOR | NO | | INITIAL | TECHNOLOGY DOES NOT HAVE GRANULAR REPORTING | REPEATABLE | NO ONGOING TEST TO DETERMINE BLOCKS CONTINUALLY STAY IN PLACE | TRANSFER | USER 3 USER 4 | NO |
| | GAP | AP (ENCRYPTED) | | NO | NO | NO | | NO % EXTENT CHANNELS | NEED INITIAL DETECTION ON ENCRYPTED CHANNELS | INITIAL | NO DETECTION OF LOSS OF DATA OVER ENCRYPTED CHANNELS | MITIGATE | USER 4 | YES |

FIG. 12

CONTROL TRANSPARENCY FRAMEWORK

BACKGROUND OF THE INVENTION

Organizations are facing increasing risks and threats from various causes, including, for example, fraud, unauthorized access to systems, and insider threats. Current organizational attempts to identify and eliminate these risks/threats are ineffective and/or are difficult to understand and implement. There is no current way to document, communicate and implement how controls are managed across the organization.

Thus, there is a need for a transparent (i.e. easy to understand) and actionable risk/reward approach for organizational processes, controls, training and development.

SUMMARY

In accordance with an aspect of the present invention, embodiments of the present invention are directed to methods, systems and computer program products for a control transparency framework in order to control and manage risks or threats. The method for a control transparency framework includes identifying threats to an organization, developing a risk score for each of the threats to develop a threat portfolio, developing a maturity portfolio, developing a control portfolio, determining a gap portfolio, and developing a control transparency portfolio to close gaps. A gap exists between a target state maturity level of each identified threat and a current maturity level of each control assigned to handle each identified threat, such that the gap occurs if the target state maturity level is at a level that is lower than the control's current maturity level.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

FIG. 2A is a chart of an example of a threat list in accordance with an embodiment of the present invention.

FIG. 2B illustrates an example of a threat list including threats, impact score, probability, and risk score in accordance with another embodiment of the present invention.

FIG. 4 illustrates three different views of organizational processes in accordance with an embodiment of the present invention.

FIG. 5A is an example of a maturity portfolio in accordance with an embodiment of the present invention.

FIG. 5B illustrates another example of the maturity portfolio in accordance with another embodiment of the present invention.

FIG. 7C illustrates another example of associating risk scores with threats and a total risk score in accordance with an embodiment of the present invention.

FIG. 8 illustrates an example of the target span of control in accordance with an embodiment of the present invention.

FIG. 10A illustrates an example of a gap portfolio in accordance with an embodiment of the present invention.

FIG. 10B illustrates an example of an action plan in accordance with an embodiment of the present invention.

FIG. 12 illustrates an example of a control transparency portfolio in accordance with an embodiment of the present invention.

DETAILED DESCRIPTION

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are directed to methods, systems, computer program products and the like that provide for a transparent and actionable risk/reward approach to communicate how controls and/or risks are managed across an organization. The embodiments are directed to a "right-sized" control portfolio that determines a span and maturity of controls based on the current risk threat landscape. These embodiments provide transparency into the controls environment, proactively manage controls environment, and create a measurement system that reflects how well the controls are working.

The following detailed description refers to the accompanying drawings which illustrate specific embodiments in accordance to the present invention. Other embodiments having different structures and operations do not depart from the scope of the present invention.

Figure 1:
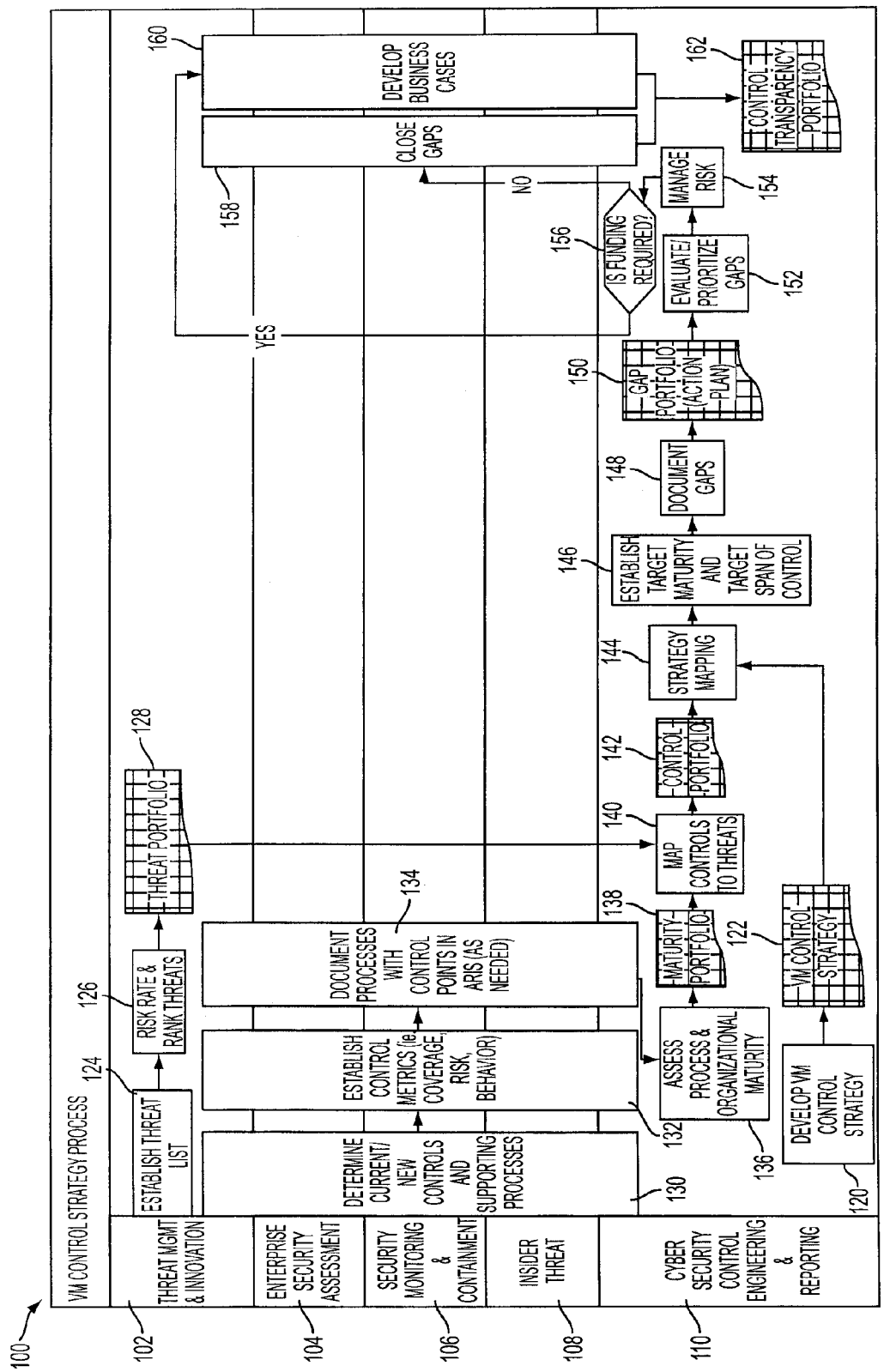
FIG. 1 is a flow chart of an example of a control transparency framework in accordance with an embodiment of the present invention.

FIG. 1 is a process flow chart illustrating an example of a control transparency framework method 100 in accordance with one embodiment of the present invention. The process flow chart is divided into sections illustrating roles or responsibilities of one or more sectors or groups of an organization, including Threat Management & Innovation 102, Enterprise Security Assessment 104, Security Monitoring & Containment 106, Insider Threat 108, and Cyber Security Control Engineering & Reporting 110. In one embodiment, one or more of the roles or responsibilities shown in FIG. 1 are undertaken by one sector or group, instead of multiple sectors. As shown in FIG. 1, all sectors or groups has the same roles and/or responsibilities, including determining current/new controls and supporting processes 130, establishing control metrics 132, documenting processes, closing gaps and/or developing business cases 134.

In order to demonstrate transparency (i.e. ease of understanding) in the controls, six deliverables are developed, including a threat portfolio 128, maturity portfolio 138, vulnerability management (VM) control strategy 122, control portfolio 142, gap portfolio 150 and control transparency portfolio 162. The activities for developing the threat portfolio 128 are undertaken by the Threat Management and Innovation sector 102. The activities for developing the maturity portfolio 138, vulnerability management (VM) control strategy 122, control portfolio 142, gap portfolio 150 and control transparency portfolio 162 are undertaken by the Cyber Security Control Engineering & Reporting (CSCER) sector 110. Each of the activities and roles/responsibilities are discussed below with reference to FIG. 1 and each of the respective figures.

In block 120, a VM control strategy is developed to establish a common control strategy. The VM control strategy provides a basis for all control decisions as each sector or group moves forward in the future. The VM control strategy not only provides a foundation but also a vision for each organizational sector and group. The strategy describes how controls will be applied throughout the organization, the priority the organization assigns to each identified risk, and what level of controls will be assigned to which risks. For example, the VM control strategy may indicate that a high risk threat will be controlled by a highly mature control. Resulting from the VM control strategy is the VM control strategy deliverable, shown in block 122. This deliverable 122 may be a report, spreadsheet, database, or any other type of strategy or plan.

In block 124, a threat list is established. Because many organizations are threat-based, the foundation of the control framework is also threat based. However, the foundation of the control framework may be based on one or more factors in addition to threat-based factors, such as risk/reward based factors, action plan based factors and other factors related to implementing a plan in an organization. Regardless, the threat portfolio, shown in block 128, provides structure and reason around placement of controls. For assessment purposes, the Threat Management and Innovation sector 102 is responsible for providing an updated threat list periodically after a predetermined time period, such as every financial quarter. An example of the threat list excerpt 200 is shown in FIG. 2A. In the illustrated embodiment of FIG. 2A, the risk category 202 (e.g. physical, technical, people, etc.) and the specific risk/threat 204 (e.g. theft and fraud, man in the middle, botnets, malware, etc.) identify the risk/threat 204.

In block 126, the risks/threats 204 are rated and ranked. As shown in FIG. 2B, to rate and rank the risks/threats 204, an impact score 206 and probability score 208 are first given to each risk/threat 204 on the threat list 210. A risk score 212 is then calculated using a risk formula. For example, the formula (not shown) used for the table of FIG. 2B calculates the risk score 212 by multiplying the impact 206 times the probability 208. The impact 206 refers to how much of an impact the risks/threats 204 may have on the organization. For example, an impact 206 having a value of "5" of the "Theft and Fraud" risk 214 in FIG. 2B indicates that this risk 214 may have a very large negative impact against the organization in the event that the risk 204 becomes reality. The probability factor 208 is directly related to what the probability of the risk/threat 204 actually occurring in the organization. The probability factor 208 may be calculated from facts (e.g. empirical data, historical data, industry data, etc.), chosen by a representative of the organization (e.g. by choosing a risk score, choosing facts to apply to the risk score, surveying multiple parties, etc.), or a combination thereof. The higher the probability score, the more likely the risk/threat 204 will occur. For example, in FIG. 2B, since the "Theft and Fraud" risk 214 has a probability value 208 of "5," this risk 214 is more likely to occur relative to other risks 204 listed in the table of FIG. 2B having probability values 208 of "3", "1", "0", etc. The impact and probability values 206, 208 may be represented in other number formats, such as ratios or percentages.

Figure 2C:
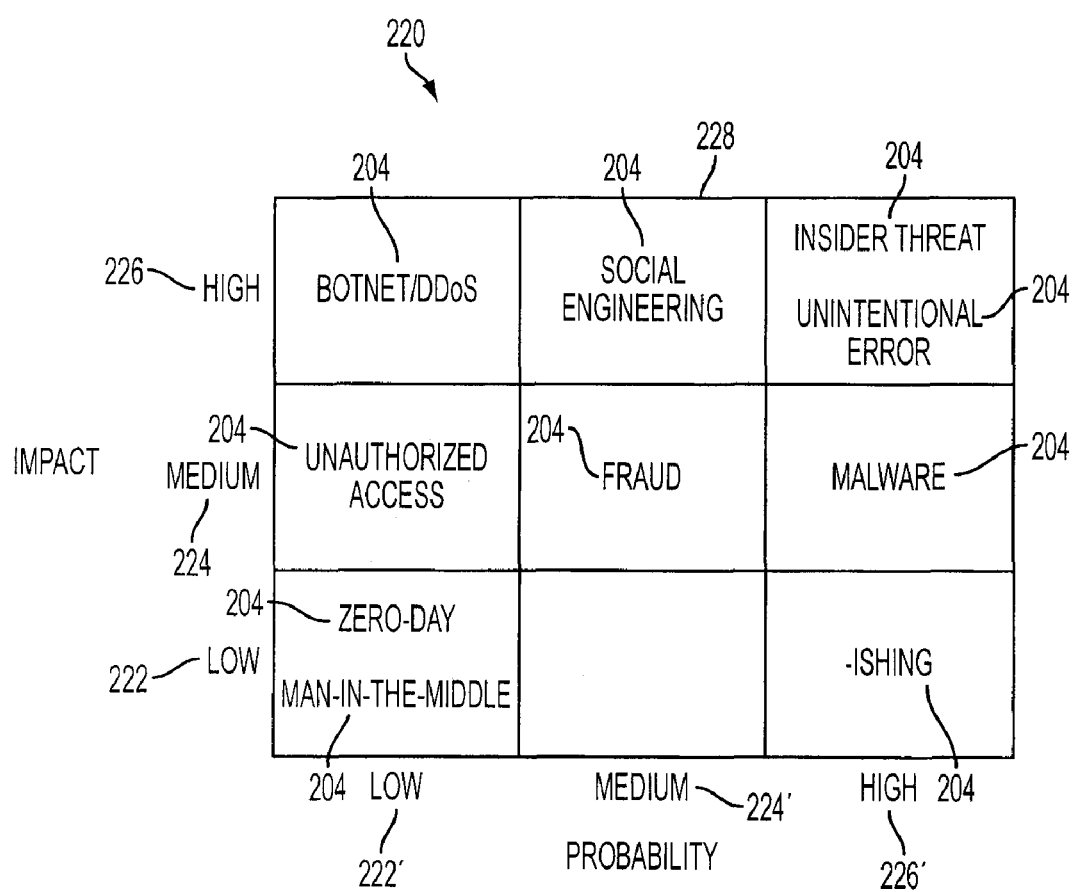
FIG. 2C illustrates an example of a 9-block NIST in accordance with an embodiment of the present invention.

As illustrated in FIG. 2C, the National Institute of Standards and Technology (NIST) 9-block model 220 is used to map risks/threats 204 that apply to the organization's environment. The NIST model 220 provides a visual representation of impact 206 versus probability 208 with a scale of low 222, medium 224, and high 226. As illustrated, the risks 204 in the upper right hand box 228 (e.g. insider threat and unintentional error) are the highest risks.

Referring back to FIG. 1, in block 128, the threat portfolio deliverable is created once the risks/threats 204 are established, rated and ranked, as previously described with regard to blocks 124 and 126. An example of the threat portfolio is illustrated in FIG. 2B at reference numeral 230. It should be understood that the threat portfolio may take other shapes or forms and may include other information and/or factors than the ones explicitly detailed in FIG. 2B. Regardless, the threat portfolio 230 is used as the foundation of control decisions made within the organization and will be used to establish control priority and focus. The Threat Management and Innovation sector 102 is responsible for creating the threat portfolio 230.

In block 130, current and new controls and supporting processes are determined. All current controls must be identified within each sector and each supporting function, including Threat Management & Innovation 102, Enterprise Security Assessment 104, Security Monitoring & Containment 106, Insider Threat 108, and Cyber Security Control Engineering & Reporting 110.

In one embodiment, a control is any administrative, management, technical, or legal method that is used to manage risk. Controls are safeguards or countermeasures and include practices, policies, procedures, programs, techniques, technologies, guidelines, organizational structures and/or other approaches or strategies to manage risk.

In block 132, control metrics are established by all organizational sectors or groups, including Threat Management & Innovation 102, Enterprise Security Assessment 104, Security Monitoring & Containment 106, Insider Threat 108, and Cyber Security Control Engineering & Reporting 110. Each mitigating control includes a set of reporting metrics. Once the control metrics accomplish control transparency and development of a risk profile, the control metrics drive organizational change. The control metrics are established using a Hoshin model which shows what amount or percentage of each control has a defined control target in the control transparency model. The goal of the Hoshin model is to be at 100% so that each target is addressed and controlled. The Hoshin model is met by utilizing the reporting triad model 300 (FIG. 3A) which establishes a coverage 302, risk 304, and behavior profile 306. As shown in the illustrated embodiment of FIG. 3A, the Hoshin triad model 300 includes three layers, including a behavior layer 306, risk layer 304 and coverage layer 302. The behavior layer 306 provides analytics into patterns of risk to drive program change and identifies issues requiring action. The coverage layer 302 provides transparency to service adoption and program penetration and highlights successes and areas requiring attention. The risk layer 304 identifies current sources of the highest risks based on open findings and provides actionable information to direct resources for the highest risks. The Hoshin triad model 300 illustrates that the behavior 306 needing to be controlled is the basis of the chart 300. The behavior layer 306 should be completely covered by the risk layer 304 and the coverage layer 302 should completely cover all risks 304.

Figures 3A, 3B:
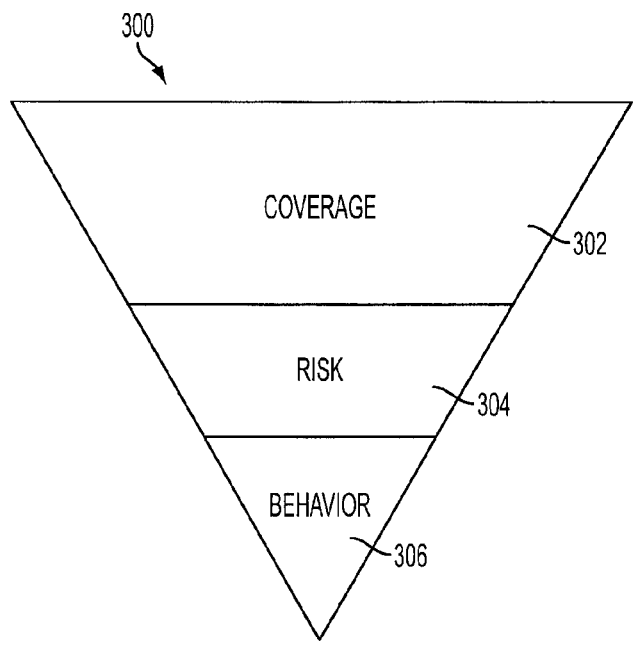
FIG. 3A is an example of a Hoshin triad model in accordance with an embodiment of the present invention.
FIG. 3B illustrates an example of a chart indicating the process/control and the metrics associated therewith in accordance with an embodiment of the present invention.

FIG. 3B illustrates a chart 310 indicating the process/control 312 and the metrics 314 associated therewith. Specifically, the coverage percentage 316 is shown with relation to each respective process/control 314. For example, with respect to the anti-virus 318, the coverage percentage is 95% (shown at 320). The behavior 322 for the anti-virus risk 318 that is being controlled is the number of users with high computer virus infection rate 324. The risk 326 of this behavior 318 is that there are a number of computers infected with viruses, leading to lower productivity and possibly loss of data or theft of data. The coverage type 328 for the anti-virus risk 326 is to detect and prevent. Although 95% is a good percentage of coverage 316, the goal is to be at 100%.

Once processes 312 are identified and metrics 314 are determined, the processes 312 are then to be documented (both with process map and process document) with appropriate control points in an appropriate repository, as is described below with regard to block 134. If documentation has already been completed, the documentation phase can be skipped and the process will go under review.

Referring to block 134 of FIG. 1, processes of an organization are analyzed and documented with control points by each sector or group, including Threat Management & Innovation 102, Enterprise Security Assessment 104, Security Monitoring & Containment 106, Insider Threat 108, and Cyber Security Control Engineering & Reporting 110. This creates an accurate view of the organizational processes through process modeling, mapping and initial control point identification. Peer reviews from other groups can be beneficial to such process. However, those most intimate with the process should be preferably involved due to being most aware of the potential and current weaknesses in the current environmental state. In order to gain a better understanding of the organization's current processes and controls, the current state of the organization's processes and maturity is documented through process modeling. This type of modeling allows us to accelerate business results by identifying improvement opportunities such as organizational duplication, non-value added activities, areas of re-work, and project/process overlap. The process modeling follows basic process mapping logic and may include breaking down the work and individual tasks, estimating level and duration of effort, calculating resource requirements, assigning responsibilities, and determining deliverables (inputs and outputs).

To begin the process modeling, process maps are first created for all core business processes. Software is used to create these process maps and is used as a central, enterprise repository for the process maps and related process data elements. The software is web browser based and utilizes shapes, data and model types via a graphical user interface (GUI).

While there are a variety of process maps that may be available, the creation of three basic levels of process maps will be sufficient for most organizational sectors, including overall process maps, high-level maps, and mid-level process maps. These process maps are illustrated in the diagram 400 of FIG. 4 and each of which illustrate roles/responsibilities and actions to be taken. The overall process map 402 is a division level map including all related subgroups 401 and gives the reader of the map an overview of the synergy between the division and the subgroups 401, including roles/responsibilities 403 and how they are interconnected between groups of an organization. The high level map 404 is a value chain map that provides the reader with no knowledge of a particular function or process with an idea of how the process works at a very high level. The mid-level model 406 is a detailed process map of overall process flow, process dependencies, vested business partners and control points. As shown in FIG. 4, the process maps 406 are stored in the Process Library 408, which may be a database or other system located on a server or other computer (not shown).

As previously mentioned, in block 134, the control points of the organization are identified. A control point is any point in the process that is designed to provide reasonable assurance regarding the achievement of objectives including the effectiveness and efficiency of operations, reliability of financial reporting, compliance with applicable laws and regulations and safeguarding of assets. A control point should be designed to mitigate risk and provide reasonable assurance that associates, management or other organizational employees will prevent or detect a "failure" from occurring. A "failure" results when a risk is not properly controlled such that a threat becomes reality and the organization is impacted. Control points are necessary to ensure that processes are running efficiently and will serve as a type of "engine warning light" to alert the organization to possible issues. Control points can be actions taken to ensure that what the organization desires to occur will occur in response to predetermined triggers.

In the initial stages of process modeling, current control points are identified to determine what controls points exist. As the methodology progresses, gaps in the controls are determined and identified, as will be discussed later in this disclosure. Objectives of the control points include accomplishing goals and objectives of the organization, achieving reliability and integrity of information, realizing economical and efficient use of resources, and safeguarding of assets. Failure of one or more control points may result in inconsistent objectives, lack of organizational integrity, weak control environment, inability to understand and react to changing conditions, and poor communication.

The control points have various classifications that should be adhered to in order to sufficiently document the control points. For example, one or more control points may be classified as preventative and/or detective. The control points may also be classified as automated or manual. Tiers may also be used to create an additional classification to relate the control points to associated metrics and/or to show their relationship to the overall process. It should be understood that these classifications are not mandatory, but, instead, are merely a consideration in case that an additional metric detail is needed.

In block 136, the organization, such as the Cyber Security Control Engineering & Reporting sector 110, performs two maturity assessments (i.e. process maturity assessment and organizational maturity assessment) as a part of the control transparency framework process 100. These assessments allow an understanding of the level of maturity and capability with each process and organization. First, the process maturity is established based on common criteria across the organization. The organization uses one or more maturity models to determine the processes maturity. A maturity model can be described as a structured collection of elements that describe certain aspects of maturity in an organization. The maturity model may provide, for example, a place to start the assessment, the benefit of prior experiences, a common language and a shared vision, a framework for prioritizing actions, and a way to define what improvement means for your organization. The maturity model can be used as a benchmark for comparison and as an aid to understanding, for example, for comparative assessment of different organizations where there is something in common that can be used as a basis for comparison. In the case of a Capability Maturity Model (CMM), for example, the basis for comparison would be the organization's software development processes.

In one embodiment, a blend of two maturity models is employed, including a Control Objective for Information and related Technology (COBIT) Maturity Model and the Capability Maturity Model (CMM). COBIT is a framework of best practices for IT management. COBIT is the general framework used in the IT industry. The COBIT mission is to research, develop, publicize and promote an authoritative, up-to-date, international set of generally accepted information technology control objectives for day-to-day use by business managers and auditors. There are various advantages to using COBIT. First, COBIT provides best practices for the management of IT processes in a manageable and logical structure. Second, COBIT is an internationally accepted set of guidance materials for IT governance.

COBIT consists of various control objectives over multiple domains. In one embodiment, the domains include: 1) Plan and Organize (PO), 2) Acquire and Implement (AI), 3) Deliver and Support (DS) and 4) Monitor and Evaluate (ME). The PO domain provides direction to solution delivery (AI) and service delivery (DS). The AI domain provides solutions and transfers these solutions so that they may be turned into services. The DS domain receives the solutions and makes them usable for end users. The ME domain monitors all processes to ensure that the direction provided is followed.

Because COBIT is a framework, associations between control points and each respective COBIT control objective should be created by the organization representative or other persons. When mapping to the COBIT framework, the COBIT domain is first identified based on the functional description of the control points. Next, the control objectives that most closely match the identified control points are drilled down and the point of correlation is marked. Multiple correlations may exist between a single control point and multiple control objectives.

As previously mentioned, CMM may also be employed in determining the maturity assessments. CMM is a process capability maturity model which aids in the definition and understanding of an organization's processes and the organizational maturity in diverse areas, such as, for example, software engineering, system engineering, project management, software maintenance, risk management, system acquisition, information technology (IT), and personnel management.

Both COBIT and CMM are used to determine the two maturity components—the organization's process maturity and the organizational maturity. The organizational maturity is established through a series of interviews and reviewing a sample of the process documentation. The interviews consist of questions around awareness and communication, processes and procedures, tools and automation, skills and expertise, responsibility and accountability, and goals and metrics. In addition to COBIT and CMM, it should be understood that other maturity models may also be employed, such as EOP or SSE-CMM.

As shown in the illustrated embodiment of FIG. 5A, after current COBIT/CMM maturity levels 502 are established, they are documented in a maturity portfolio, which is described further below with regard to block 138. As illustrated in FIG. 5A, the current maturity level 502 has values associated with each process 504 ranging from "non-existent," "initial," "repeatable," "defined," "managed," and "optimized." "Non-existent" refers to a complete lack of any recognizable processes. For example, for a process 504 to be labeled as "non-existent," the organization has not recognized that there is an issue to be addressed. "Initial" means that there is evidence that the organization has recognized that the issues exist and need to be addressed, but there are no standardized processes that are in place. Instead, there are only ad hoc approaches that tend to be applied on an individual or case-by-case basis. In this stage, the overall approach to management is disorganized. For "repeatable," processes have developed to the stage where similar procedures are followed by different people undertaking the same task. But there is no formal training or communication of any standard procedures, and responsibility is left to the individual such that there is a high degree of reliance on the knowledge of the individual, and therefore, errors are likely to occur. "Defined" refers to procedures that have been standardized, documented, and communicated through training. However, the individual is relied upon to follow these processes, and it is unlikely that deviations from these processes will be detected. The procedures themselves are not sophisticated but rather are the formalization of existing practices. For "managed," it is possible to monitor and measure compliance with procedures and action is taken where processes appear not to be working effectively. Processes are under constant improvement and provide good practice. Automation and tools are used in a limited or fragmented way. "Optimized" means that the processes have been refined to a level of best practice, based on the results of continuous improvement and maturity modeling with other organizations. IT is used in an integrated way to automate the workflow, providing tools to improve quality and effectiveness so that the organization is quick to adapt.

The CMM model (not shown) also has levels to indicate the control maturity. The levels range from 0-5. Level 0 indicates that no process is in place. Level 1 indicates that the base practices are being performed, but they are only being "performed informally." Level 1 focuses on whether an organization or project performs a process that incorporates the base practices and thus level 1 can be characterized by the statement, "you have to do it before you can manage it." For level 2, the processes are "planned and tracked." Level 2 focuses on project-level definition, planning, and performance issues and thus, can be characterized by the statement, "let's understand what's happening on the project before defining organization-wide processes." In Level 3, the processes are "well defined," which focuses on disciplined tailoring of the defined processes at the organization level. This level can be characterized by the statement, "use the best of what you've learned from your projects to create organization-wide processes." Level 4 indicates that processes are "quantitatively controlled," which focuses on measurements being tied to the business goals of the organization. Although it is essential to begin collecting and using basic project measures early, measurement and use of data is not expected organization-wide until the higher levels have been achieved. This level can be characterized by the statements, "you can't measure it until you know what 'it' is" and "managing with measurement is only meaningful when you're measuring the right things." Level 5 indicates that the processes are "continuously improving." Level 5 gains leverage from all the management practice improvements seen in the earlier levels, and then emphasizes the cultural shifts which, if implemented, will sustain the gains made. This level can be characterized by the statement, "a culture of continuous improvement requires a foundation of sound management practice, defined processes, and measurable goals."

In block 138, the maturity portfolio is created. The maturity portfolio provides transparency for all controls and includes all processes that support each of the controls. FIG. 5A illustrated an example of the maturity portfolio 500 in accordance with one embodiment. In FIG. 5A, compliance remediation 506 is the only control shown in the maturity portfolio 500. Although only one control is illustrated in the maturity portfolio of FIG. 5A, more than one control may be included in the maturity portfolio 500. Also, one or more processes 504 are illustrated in connection with the control 506. The control 506 is mapped to a maturity level 502 using the COBIT/CMM models, as previously discussed. For example, the "compliance remediation" control 506 has a maturity level 502 of "repeatable" 509 associated therewith. This indicates a low level of maturity. Additionally, as shown in FIG. 5A, each of the processes 504 may have a maturity level 502 associated therewith. For example, the "ESM Server Compliance Remediation" process 508, which is a process that is associated with the "compliance remediation" control 506, has a "repeatable" maturity level 510 associated therewith. By way of another example, a maturity level of "Non-existent/New" 512 is associated with the "Firewall Ruleset Remediation" process 514, which is also associated with the "compliance remediation" control 506.

After the maturity portfolio is developed, controls 506 are mapped to the risks/threats, as represented in block 140. This mapping creates a control portfolio, as represented in block 142. For example, the control portfolio 142 is created by mapping the risk score values 212 of each risk/threat 204 from the threat portfolio 230 (FIG. 2B), as previously described with respect to block 128, to the maturity portfolio 138. As shown in the illustrative embodiment in FIG. 5B, the control portfolio 530 includes categories such as programs 522, functions 524 and controls 526 and a matrix of threats 528 mapped to each of the controls 526. The "compliance remediation" control 530 has values for one or more threats 528 mapped thereto. The values of the respective threats 528 are mapped to the "compliance remediation" control on the control portfolio. For example, the "compliance remediation" control 530 aids in managing the "insider threat" risk 532 and thus, the value 534 of the "insider threat" (e.g. "81") is mapped from the "insider threat" risk 532 to the "compliance remediation" control 530. The value of "81" is calculated based on the "insider threat" 532 being a high impact (e.g. having a value of "9") and having a high probability (e.g. having a value of "9"). As previously discussed with regard to FIG. 2, the threat value is calculated by multiplying product of the impact (e.g. having a value of either 1, 3, or 9) and probability (e.g. having a value of either 1, 3, or 9) and thus, resulting in an "81" value for the "insider threat." In any event, one or more of the other threats associated with the "compliance remediation" control 530, such as "fraud" 536 or "unauthorized access" 538, are also mapped to the control portfolio 520 in a similar fashion as described with regard to the mapping of the "insider threat" 532. The control portfolio 520 enables the organization to quickly evaluate the span of control in relation to the threats 528.

Figure 6:
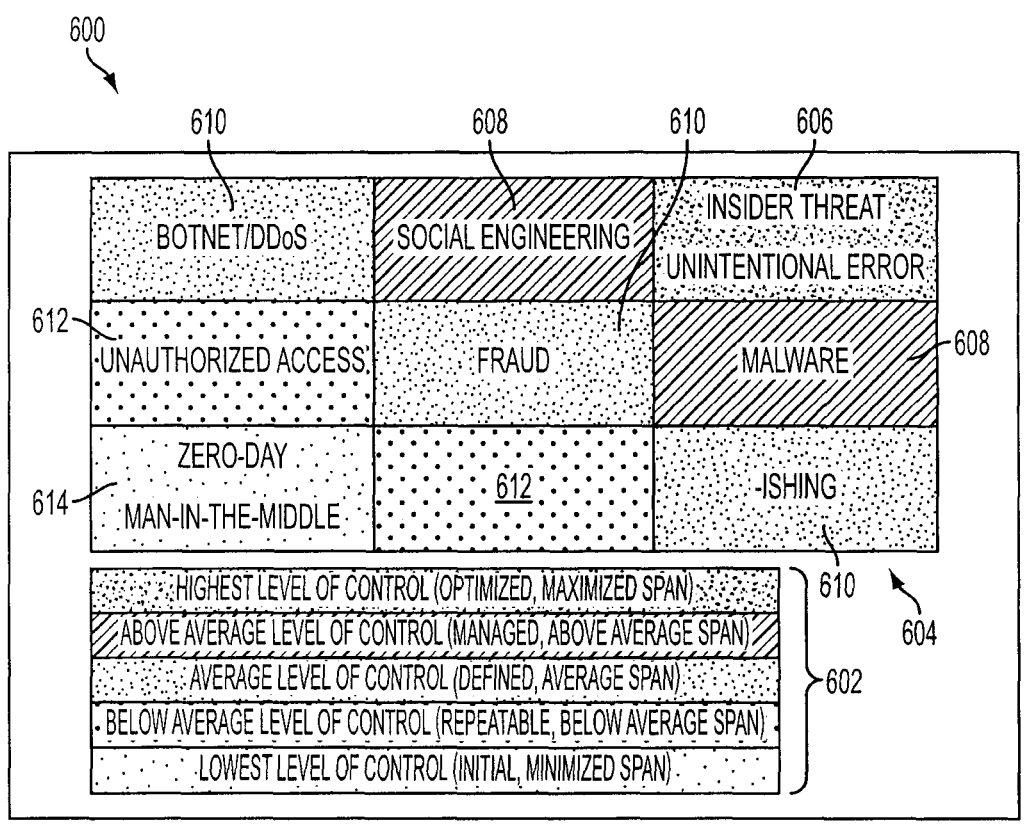
FIG. 6 illustrates an example of a strategy map using the 9-block NIST model in accordance with an embodiment of the present invention.

Once the control portfolio 520 is completed, the control strategy is applied via a strategy mapping, as represented in block 144. The control strategy is determined by the organization. In other words, the organization will determine which blocks in the 9-block NIST model will have the highest, middle, and lowest level of control. For example, in the illustrative embodiment 600 of FIG. 6, a color-coded legend 602 shows the strategy mapping for the threats on the 9-block NIST model 604. In this 9-block NIST model 604, the upper-row right-hand block 606 (and thus, all threats located in this block 606) was chosen to receive the highest level of control; the top row-middle and the right-hand middle-row blocks 608 (and thus, all threats located in these blocks 608) were chose to receive an above average level of control; the top-row left-hand block, center block and bottom-row right-hand block 610 (and thus, all threats located in these blocks 610) were chose to receive an average level of control; the left-hand middle-row block, and the bottom-row middle block 612 (and thus, all threats located in these blocks 612) were chose to receive a below average level of control; and last, the bottom-row left hand block 614 (and thus, all threats located in this block 614) was chosen to receive the lowest level of control. Thus, since the organization, in this example, has decided to have a control strategy that all high risk threats should have a highest level of control, the organization must determine which controls need to be at the highest control level. Similarly, the organization must determine which controls need to be at an average control, above average control, lowest control, and so on. To do this, a score is calculated based on the threat ratings as well as how many threats are mapped to the control. For example, each threat gets a score based on position in the 9-block model 604. Then, for each control, the risk score for each threat associated with the control is aggregated giving a total threat score for each control. This is process is discussed in more detail below with respect to FIGS. 7A-C.

After the strategy mapping is achieved represented by block 144 of FIG. 1, each process has a level of maturity established using COBIT, CMM, other maturity models and/or a combination thereof. Next, in block 146, a target maturity state is established for each control based on the control strategy. The target maturity for each control optimizes the control portfolio in both span and maturity to achieve the desired risk mitigation level. For a threat that has high probability and high impact, the highest span of control as well as maturity is desired. For example, controls having a high level of threat may have a target set at "Managed," controls having medium level of threat may have a target set at "Defined," and controls having a low level of threat may have a target set at "Repeatable."

Figures 7A, 7B:
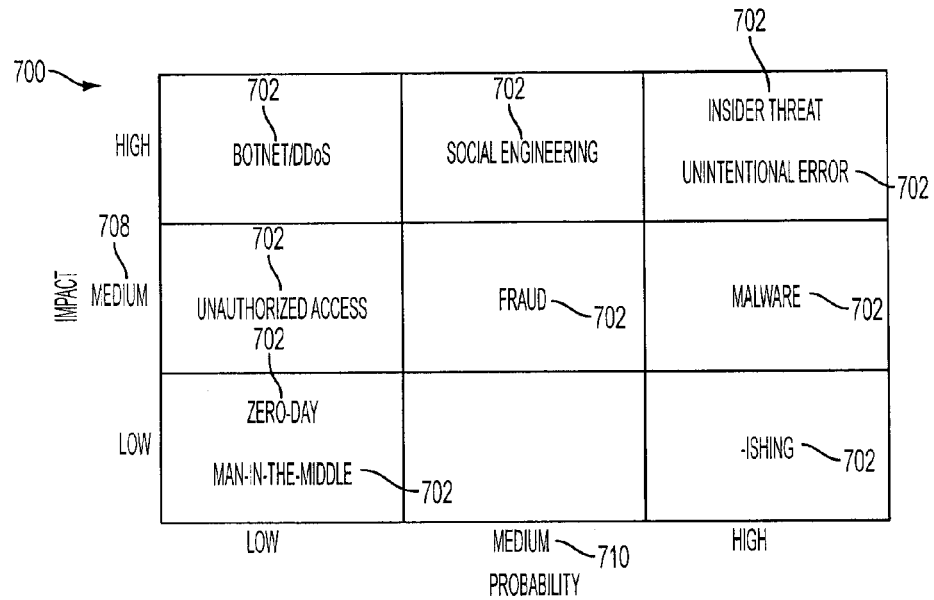
FIG. 7A is another example of the 9-block NIST model in accordance with another embodiment of the present invention.
FIG. 7B illustrates an example of associating a risk score with each threat in accordance with an embodiment of the present invention.

Also in block 146, the current level of the control maturity is determined. For example, by applying a value of 1, 3, 9 for low, medium and high, respectively, based on the NIST 9-Block 700 in FIG. 7A, each threat 702 receives a score 704 as is illustrated in FIG. 7B. As previously described, by using a simply risk formula (Risk=Impact×Probability), a threat score 704 is calculated. For example, the threat 702 of "fraud" 706 has a medium impact 708 on the NIST model 700 of FIG. 7A, which correlates to a "3" value. Similarly, a medium probability 710 on the NIST model 700 results in a value of "3." Therefore, the "fraud" threat 706 receives a final score of "9," which is calculated by multiplying the impact value of "3" times the probability value of "3." This process is repeated for each of the threats 702 in the NIST model 700. Because each control 710 may be mapped to multiple threats 702, a cumulative score 712 is calculated based on the threats 702 linked to a particular control. For example, in FIG. 7C, the "supplier assessment" control 710 has six threats 704 associated therewith, including "insider threat," "unintentional error," "malware," "botnets/DDoS," "fraud," and "unauthorized access," and each of the respective threats values are 81, 81, 27, 9, 9, and 3, respectively. Thus, the total score 712 for the "supplier assessment" control 710 is determined by the adding the respective threat values 704 (i.e. 81+81+27+9+9+3), which equals a total score of 210.

After achieving the total threat score 712 of a control 710, the total threat score 712 is compare to threshold values for the COBIT/CMM models. In one embodiment, the threshold values are determined based on all of the selected threats. For example, if the sum 712 of all of the selected threats' values 704 equals 190, then the threshold value for the "managed" level will be 190. In this instance, since the control total score 712 was calculated above to be equal to 210, this would exceed the 190 threshold value and thus, the current maturity level of the "supplier assessment" control 710 is determined to be at "managed." The other level thresholds may also be determined in a similar fashion. For example, the threshold level of "defined" and "repeatable" is set at, for example, 90 such that if the total threat score 712 of the control 710 is less than 90, then the current maturity level is "repeatable." However, if the total threat score 712 of the control 710 is greater than 90, then the current maturity level is determined to be "defined."

In addition to the target maturity, in block 146, the second layer of control that will be analyzed is the span of control. Analyzing the span of control allows for the organization to determine when additional controls are needed rather than a more mature control or process. In the exemplary chart 800 shown in FIG. 8, the span of the controls on sensitive data leakage is illustrated. As is clearly indicated, the current level 801 of the encrypted non-public information (NPI) monitoring control 802 is non-existent. Thus, the span of controls demonstrates which controls 804 are strong as well as which controls 804 are non-existent.

After the initial modeling is complete, it is necessary to conduct an assessment of all related systems, policies, procedures and practices and accompanying it with a security risk analysis. While performing this assessment, it is important to review key business processes, workflow, and data flow, giving special attention to use, storage and transmission of data. Gaps due to low maturity must be identified in order to reach the target maturity for each process, as represented in block 148. Also, after a current span of control and target span of control is established, gaps need to be documented in order for planning to move forward to close the gaps and reach the desired target state.

The organization should identify gaps between the organization's current policies, procedures, systems and applications in all facilities in order to minimize any disruptions to your services, financial penalties and audit issues. This is done in contrast to many organizations which might wait for gaps to be identified for them by external third parties, audits or regulatory agencies. In order to ensure ongoing process stability, one should look at future business trends in order to anticipate changes in both internal and external factors that may be relevant to the organization's product/service stream. Such factors include future business demands (new products/services, acquisitions, etc), resource capacity and training, regulatory assessment, data flow and integrity evaluation, information latency evaluation, communication gaps, and reaffirming key performance indicators.

As can be readily seen in FIG. 8, a gap is identified for the NPI encrypted monitoring control 802 due to the discrepancy between the current level 805 of "non-existent" 801 and the target level 806 of "initial" 808. By way of another example, there is a maturity gap for the "proxy block" control 810 where the current maturity level 805 is lower ("initial" 812) than the target level ("repeatable" 814).

After potential process gaps have been identified, work can begin towards making improvements to the overall process and begin brainstorming the best solutions to fill these gaps (both non-existent gaps and maturity gaps). Further, after process gaps and inefficiencies have been identified, a control accelerator (described below with respect to FIG. 9) is used to establish appropriate level of control needed for the threat.

Figure 9:
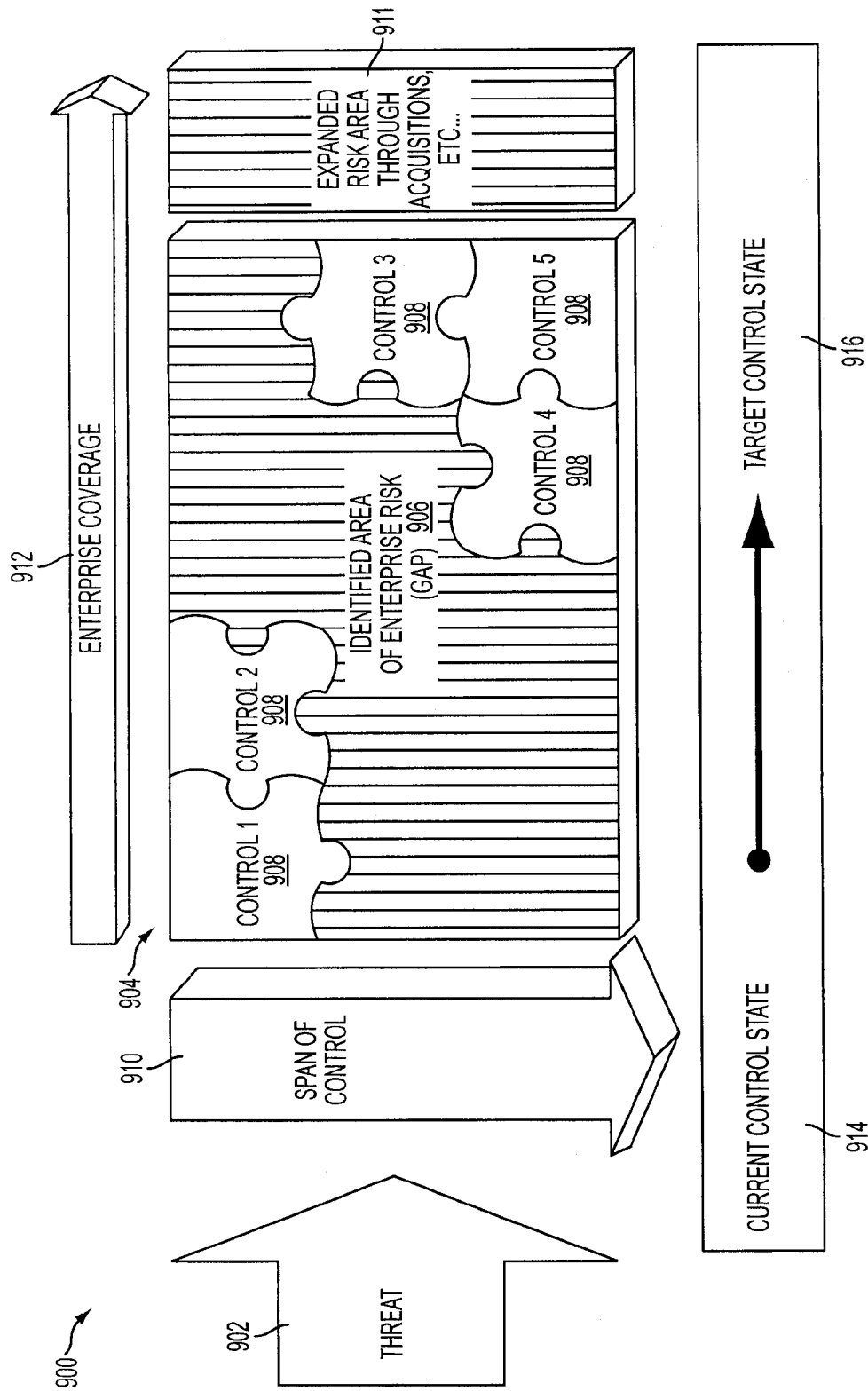
FIG. 9 illustrates an example of the control transparency framework system and a control accelerator in accordance with an embodiment of the present invention.

FIG. 9 illustrates the overall control framework process via a block process diagram 900, where a threat 902 attempts to enter the system 904 through the gap 906. The control pieces 908 are needed to cover all gap areas 906 such that the threat 902 cannot breach the system 904. In leveraging the span of control 910, the control pieces 908 can be expanded over the gaps 906 and new control pieces (not shown) can be added to cover the expanded risk gap area 911, which may result through acquisitions, identified non-existent control areas, etc. Thus, the full enterprise coverage area 912 should be covered by the controls 908 such that the "current control state" 914 (shown having gaps 906) should be at the "target control state" 916 (not shown, but all gaps shown be covered by the control pieces 908).

As represented in block 150, the gap portfolio is created by comparing the current state of the control portfolio with the target levels. An example of the gap portfolio 1000 is illustrated in FIG. 10A. As is illustrated, the gaps 1001 are identified in the gap portfolio 1000. The gap portfolio 1000 may also include an action plan 1010 to detail the roles and responsibilities 1012 of those in the organization to establish, manage and review the controls. A sample action plan 1010 is illustrated in FIG. 10B.

In block 152, after data is gathered, each organizational sector or group evaluates and prioritizes the gaps based on related threats and overall control level and resources available within the team. Once the evaluation and prioritization is complete, any organizational risk needs to be escalated to a governing body in the organization in order to manage risk appropriately within the organization.

In block 154, the risks are managed by the organization. The risk management process is utilized to establish transparency with senior management. As previously mentioned, the risks are escalated to an organizational governing body. The governing body consists of the company executives, such as managers, CIO, and other executives, as well as the risk management sector which determines and manages risks for the organization. The organizational governing body makes the decisions to accept, avoid, mitigate, or transfer the risks based on a case-by-case basis. In assisting in making these decisions, the gap portfolio is used to provide the gap information as well as the risks posed. In other embodiments, one or more of the other portfolios (e.g. threat portfolio, control portfolio, maturity portfolio, etc.) are used in the decision-making process.

If the decision is to accept the risk, the governing body accepts the possibility of consequences in the event that the risk becomes reality. The acceptance by the governing body is be documented and signed by governing body at the time of the decision. An example of when a governing body may accept the risk is if the costs of managing the risk exceed the reward or advantages of management of the risk.

If the decision is to avoid/eliminate the risk, the governing body may discontinue the technical or business activities associated with a particular risk. For example, the governing body may eliminate a particular operating system which may present risks through its use. By eliminating the operating system, any associated risks are avoided.

If the decision is to mitigate the risk, the governing body may seek to reduce the magnitude of a potential risk consequence or to reduce the likelihood of the consequence arising, by, for example, reducing casual threats or eliminating vulnerabilities. To mitigate the risk, business approval from the governing body, for example, needs to be acquired.

If the decision is to transfer the risk, the governing body assigns the line of business or sector responsible for taking responsibility for at least some of the consequences associated with a particular risk. In this case, the governing body may indemnify or compensate the line of business for any resulting consequences of a particular risk.

In any event, based on the decision of the governing body, each team is responsible for taking the appropriate action to close the identified gaps. In decision block 156, a determination is made as to whether funding is required to close a particular gap. If so, a business case is developed, as is described in more detailed with regard to block 160. On the other hand, in block 158, if no funding is required and approval is granted, the sector of the organization which is responsible for the control implements actions and/or controls to close the gaps.

Figure 11:
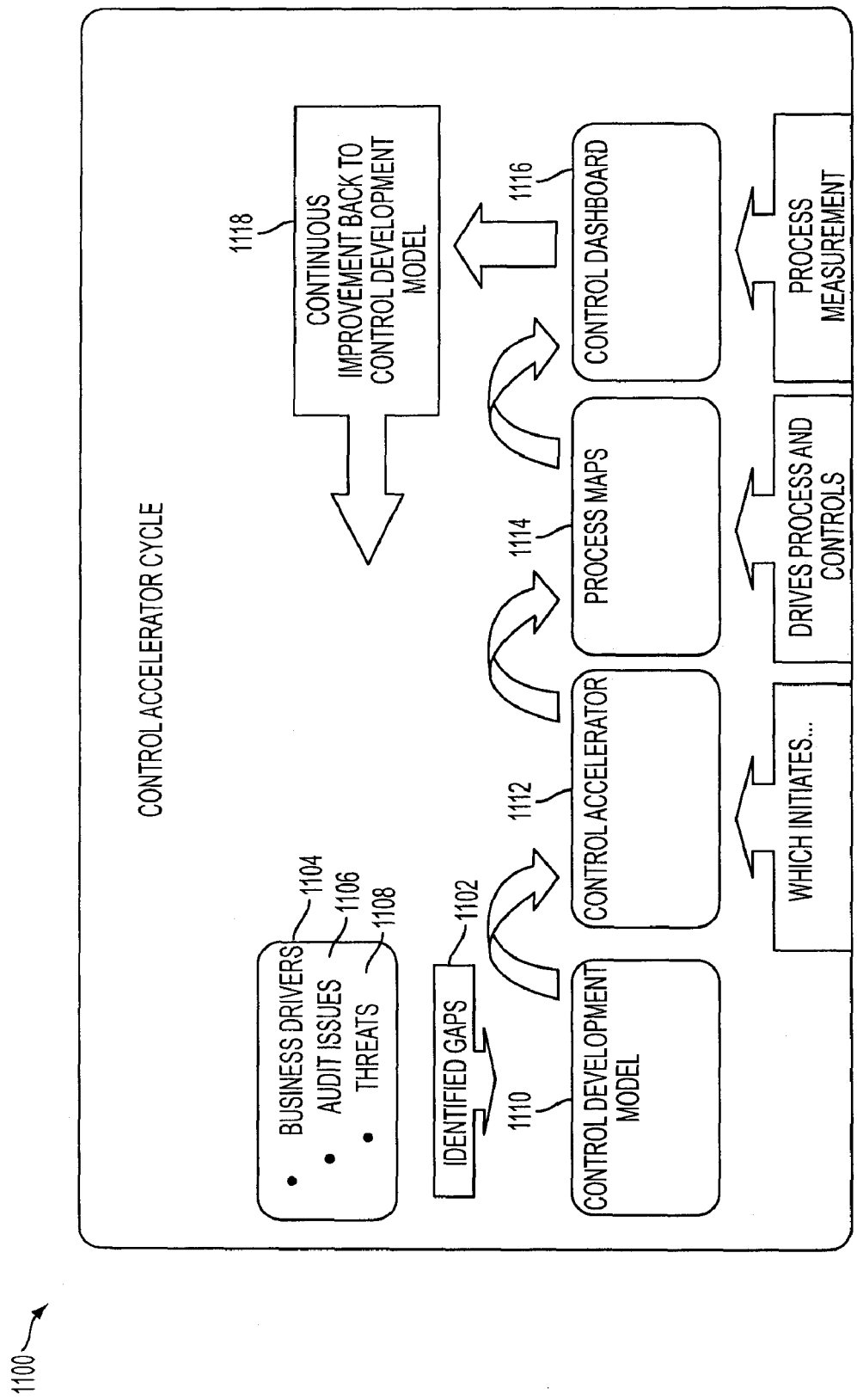
FIG. 11 illustrates an example of a control accelerator cycle and processes of the control transparency framework method in accordance with an embodiment of the present invention.

If needed, each team can utilize the control accelerator, as previously mentioned, in order to establish an adequate level of control for the organization. The control accelerator is a defined process with tools & templates that drive clarity on how to move from little or no control to detective/preventative controls. As illustrated in FIG. 11, opportunities to improve controls and gaps are identified (block 1102) by the outside environment, such as business drivers 1104, audit issues 1106, and/or threat modeling 1108, and by the effectiveness of the control in the current environment. After the gaps have been identified 1102, controls are developed via a control development model 1110, which begins with the control accelerator 1112. The control accelerator 1112 quantifies the risk and control environment and provides a set of repeatable processes and tools to improve the control environment. The output of the control accelerator will be new or enhanced processes and/or control tools. Process maps 1114 drive the processes and controls by assigning roles and responsibilities and allow the proper organizational sectors to carry out the processes and controls. The new or enhance controls and processes are measured for effectiveness using a control dashboard 1116. The control dashboard 1116 provides a high-level view at the control environment as a whole. Continuous improvement 1118 back to the beginning of the process in FIG. 11 allows for new processes and controls to be developed as well as improving current processes and controls.

In block 160, a business case is developed to justify the need for additional controls or modifications to existing products and/or services. New business case initiatives are created to either meet the changing demands of a particular business process or to address possible deficiencies or gaps. Business case development supports key organizational considerations in making a decision for pursuing a new opportunity or approach. As a communications vehicle, the business case identifies goals and measures for tracking the move to the final end state. Business case development typically examines five areas of organizational planning to make their case statements: 1) deciding goals and actions, including developing alternative approaches; 2) estimating the likely costs and developing potential risks; 3) estimating the likely benefits; 4) developing a proposal for proceeding; and 5) closing the deal, including making final adjustments and proceeding to development.

In block 162, the control transparency portfolio incorporates people, sectors/groups, processes and technology to have an established risk profile for all gaps as well as current controls.

FIG. 12 illustrates an example of the control transparency portfolio 1200 in accordance with one embodiment. As illustrated, the control transparency portfolio 1200 adds to the gap portfolio 150 the risks involved 1202, risk decision 1204, the person who approved the risk 1206, and whether the risk is funded or not 1208.

Figure block schematic of an example of a system 1300 for the control transparency framework in accordance with an embodiment of the present invention. The system 1300 may include a module for control transparency framework (hereinafter "control transparency framework module") 1302 operable on a computer system 1304, or similar device of a user 1306 or client. Alternatively, or in addition to the control transparency framework module 1302 on the user's computer system 1304 or client, the system 1300 may include a control transparency framework module 1308 operable on a server 1310 (hereinafter "server control transparency framework module") and accessible by the user 1306 or client 1304 via a network 1312. The methods 100, 900 and 1100 may be embodied in or performed by the control transparency framework module 1302 and/or the server control transparency framework module 1308. For example, the methods 100, 900 and 1100 may be performed by the control transparency framework module 1302. In another embodiment of the invention, the methods 100, 900 and 1100 may be performed by the server control transparency framework module 1308. In a further embodiment of the present invention, some of the features or functions of the methods and systems 100, 900 and 1100 may be performed by the control transparency framework module 1302 on the user's computer system 1304 and other features or functions of the methods 100, 400, 500, and 600 may be performed on the server control transparency framework module 1308.

Figure 13:
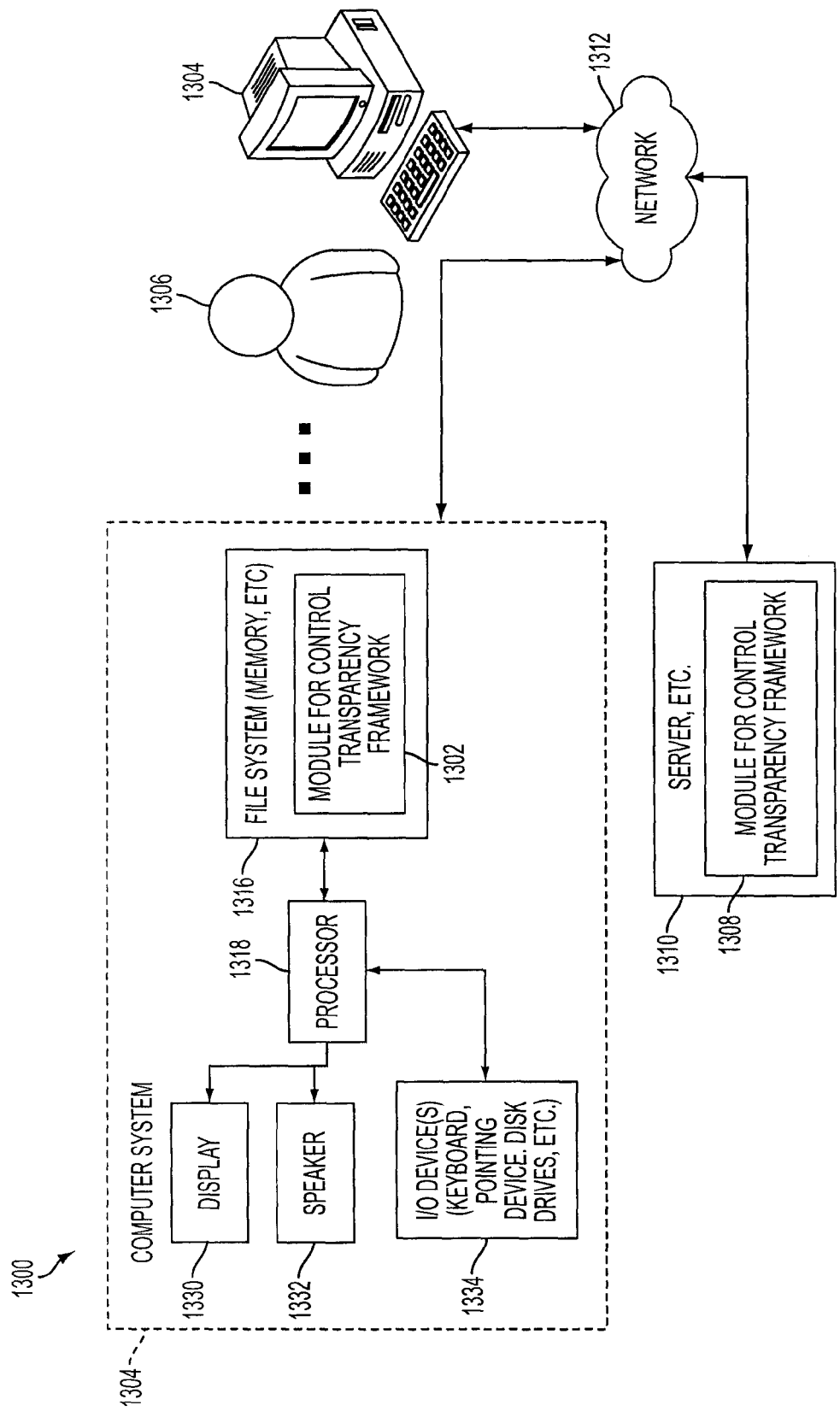
FIG. 13 is a block schematic of an example of a system for the control transparency framework in accordance with an embodiment of the present invention.

The network 1312 may be the Internet, a private network or other network. Each computer system 1304' may be similar to the exemplary computer system 1304 and associated components illustrated in FIG. 13.

The control transparency framework module 1302 and/or 1308 may be a self contained system with embedded logic, decision making, state based operations and other functions. The self contained system may allow businesses, individuals, services, locations, and the like to obtain data and/or information related to controls, risks/threats, strategies and the like.

The control transparency framework module 1302 may be stored on a file system 1316 or memory of the computer system 1304. The control transparency framework module 1302 may be accessed from the file system 1316 and run on a processor 1318 associated with the computer system 1304.

The user computer system 1304 may also include a display 1330 and a speaker 1332 or speaker system. The display 1330 may present information related to the control transparency framework system 1300, such reports, portfolios, and the like, as described herein, and may permit input of data and information into the system 1300. Any GUIs (not shown) associated with the control transparency framework module 1308 may also be presented on the display 1330. The speaker 1332 may present any voice or other auditory signals or information to the user 1306.

The user computer system 1304 may also include one or more input devices, output devices or combination input and output device, collectively I/O devices 1334. The I/O devices 1334 may include a keyboard, computer pointing device or similar means to control operation of the control transparency framework processes 100 and system 1300, as described herein. The I/O devices 1334 may also include disk drives or devices for reading computer media including computer-readable or computer-operable instructions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A method for a control transparency framework, comprising:
    identifying threats to an organization;
    developing a risk score for each of the threats to develop a threat portfolio, wherein the risk score is indicative of an impact each threat may have on the organization and a probability of the threat occurring;
    developing a maturity portfolio comprising a maturity level for controls, the maturity levels being determined utilizing a maturity model, the maturity model comprising a Control Objective for Information and Related Technology (COBIT) maturity model, a Capability Maturity Model (CMM), or a combination of the above;
    configuring at least one processor to perform the function of mapping information from the threat portfolio to the maturity portfolio to develop a control portfolio;
    determining a gap portfolio comprising identifying any gaps between a target state maturity level of each control and a current maturity level of each control assigned to handle each of the at least one identified threat, such that the gap occurs if the target state maturity level is at a level that is higher than the current maturity level; and
    developing a control transparency portfolio to close each of the gaps to match or exceed the target state maturity level.

2. The method of claim 1, further comprising developing a vulnerability management control strategy comprising at least one of describing how each control will be applied throughout the organization, determining a priority for each identified risk, and determining what level of control will be assigned to each risk.

3. The method of claim 1, wherein the developing a maturity portfolio comprises:
    determining new controls and processes;
    establishing control metrics; and
    documenting processes with control points.

4. The method of claim 3, wherein the developing a maturity portfolio further comprises assessing process and organizational maturity.

5. The method of claim 1, wherein determining a gap portfolio further comprises:
    identifying the target state maturity level for each control;
    identifying the current maturity level of each control assigned to handle each of the at least one identified threat; and
    documenting the gaps.

6. The method of claim 1, wherein determining a gap portfolio further comprising determining a strategy map via a 9-block NIST model by assigning the target state level for each block of the NIST model, wherein each threat is assigned to one of the nine NIST blocks.

7. The method of claim 1, further comprising evaluating and prioritizing at least one of the gaps.

8. The method of claim 1, further comprising managing the risks.

9. The method of claim 8, wherein the managing the risks comprises taking at least one of the following actions: accepting the risks, avoiding the risks, mitigating the risks, and transferring the risks.

10. A computer program product for implementing a control transparency framework, the computer program product embodied in a non-transitory computer-readable storage medium having a computer program residing thereon, the computer program comprising:
- instructions for identifying threats to an organization;
- instructions for developing a risk score for each of the threats to develop a threat portfolio, wherein the risk score is indicative of an impact each threat may have on the organization and a probability of the threat occurring;
- instructions for developing a maturity portfolio comprising a maturity level for controls, the maturity levels being determined utilizing a maturity model, the maturity model comprising a Control Objective for Information and Related Technology (COBIT) maturity model, a Capability Maturity Model (CMM), or a combination of the above;
- instructions for mapping information from the threat portfolio to the maturity portfolio to develop a control portfolio;
- instructions for determining a gap portfolio comprising identifying any gaps between a target state maturity level of each control and a current maturity level of each control assigned to handle each of the at least one identified threat, such that the gap occurs if the target state maturity level is at a level that is higher than the current maturity level; and
- instructions for developing a control transparency portfolio to close each of the gaps to match or exceed the target state maturity level.

11. The computer program product of claim 10, further comprising instructions for developing a vulnerability management control strategy that comprises at least one of instructions for describing how each control will be applied throughout the organization, instructions for determining a priority for each identified risk, and instructions for determining what level of control will be assigned to each risk.

12. The computer program product of claim 10, wherein the instructions for developing a maturity portfolio comprises:
- instructions for determining new controls and processes;
- instructions for establishing control metrics; and
- instructions for documenting processes with control points.

13. The computer program product of claim 12, wherein the instructions for developing a maturity portfolio further comprises instructions for assessing process and organizational maturity.

14. The computer program product of claim 10, wherein the instructions for determining a gap portfolio further comprises:
- instructions for identifying the target state maturity level for each control;
- instructions for identifying the current maturity level of each control assigned to handle each of the at least one identified threat; and
- instructions for documenting the gaps.

15. The computer program product of claim 10, further comprising instructions for evaluating and prioritizing at least one of the gaps.

16. Apparatus for control transparency framework, the apparatus comprising
- means for identifying threats to an organization;
- means for developing a risk score for each of the threats to develop a threat portfolio, wherein the risk score is indicative of an impact each threat may have on the organization and a probability of the threat occurring;
- means for developing a maturity portfolio comprising a maturity level for controls, the maturity levels being determined utilizing a maturity model, the maturity model comprising a Control Objective for Information and Related Technology (COBIT) maturity model, a Capability Maturity Model (CMM), or a combination of the above;
- means for mapping information from the threat portfolio to the maturity portfolio to develop a control portfolio;
- means for determining a gap portfolio comprising identifying any gaps between a target state maturity level of each of control and a current maturity level of each control assigned to handle each of the at least one identified threat, such that the gap occurs if the target state maturity level is at a level that is higher than the current maturity level; and
- means for developing a control transparency portfolio to close each of the gaps to match or exceed the target state maturity level.

17. The apparatus of claim 16, further comprising means for developing a vulnerability management control strategy that comprises at least one of means for describing how each control will be applied throughout the organization, means for determining a priority for each identified risk, and means for determining what level of control will be assigned to each risk.

18. The apparatus of claim 16, wherein the means for developing a maturity portfolio comprises:
- means for determining new controls and processes;
- means for establishing control metrics; and
- means for documenting processes with control points.

19. The apparatus of claim 18, wherein the means for developing a maturity portfolio further comprises means for assessing process and organizational maturity.

20. The apparatus of claim 16, wherein the means for determining a gap portfolio further comprises:
- means for identifying the target state maturity level for each control;
- means for identifying the current maturity level of each control assigned to handle each of the at least one identified threat; and
- means for documenting the gaps.

21. The apparatus of claim 16, further comprising means for evaluating and prioritizing at least one of the gaps.

22. A system for control transparency framework, the apparatus comprising:
- a computer processor;
- a data structure operable on the computer processor to identify threats to an organization;
- a data structure operable on the computer processor to develop a risk score for each of the threats to develop a threat portfolio, wherein the risk score is indicative of an impact each threat may have on the organization and a probability of the threat occurring;
- a data structure operable on the computer processor to develop a maturity portfolio comprising a maturity level for controls, the maturity levels being determined utilizing a maturity model, the maturity model comprising a Control Objective for Information and Related Technology (COBIT) maturity model, a Capability Maturity Model (CMM), or a combination of the above;
- a data structure operable on the computer processor to map information from the threat portfolio to the maturity portfolio to develop a control portfolio;

a data structure operable on the computer processor to determine a gap portfolio comprising identifying any gaps between a target state maturity level of each control and a current maturity level of each control assigned to handle each of the at least one identified threat, such that the gap occurs if the target state maturity level is at a level that is higher than the current maturity level; and a data structure operable on the computer processor to develop a control transparency portfolio to close each of the gaps to match or exceed the target state maturity level.

23. The system of claim 22, further comprising a data structure operable on the computer processor to develop a vulnerability management control strategy that comprises at least one of a data structure operable on the computer processor to describe how each control will be applied throughout the organization, a data structure operable on the computer processor to determine a priority for each identified risk, and a data structure operable on the computer processor to determine what level of control will be assigned to each risk.

24. The system of claim 22, wherein the data structure operable on the computer processor to develop a maturity portfolio comprises:

a data structure operable on the computer processor to determine new controls and processes;

a data structure operable on the computer processor to establish control metrics; and a data structure operable on the computer processor to document processes with control points.

25. The system of claim 24, wherein the data structure operable on the computer processor to develop a maturity portfolio further comprises a data structure operable on the computer processor to assess process and organizational maturity.

26. The system of claim 22, wherein the data structure operable on the computer processor to determine a gap portfolio further comprises:

a data structure operable on the computer processor to identify the target state maturity level for each control;

a data structure operable on the computer processor to identify the current maturity level of each control assigned to handle each of the at least one identified threat; and a data structure operable on the computer processor to document the gaps.

27. The system of claim 22, further comprising a data structure operable on the computer processor to evaluate and prioritize at least one of the gaps.

* * * * *